United States Patent [19]

Takeuchi

[11] Patent Number: 4,846,330
[45] Date of Patent: Jul. 11, 1989

[54] CLUTCH COVER ASSEMBLY

[75] Inventor: Hiroshi Takeuchi, Higashiosaka, Japan

[73] Assignee: Kabushiki Kaisha Daikin Seisakusho, Neyagawa, Japan

[21] Appl. No.: 231,624

[22] Filed: Aug. 12, 1988

Related U.S. Application Data

[63] Continuation of Ser. No. 11,811, Feb. 6, 1987, abandoned.

[30] Foreign Application Priority Data

Feb. 7, 1986 [JP] Japan .............................. 61-17119[U]

[51] Int. Cl.$^4$ ............................................ F16D 13/72
[52] U.S. Cl. .................................. 192/113 A; 192/89 B
[58] Field of Search ............... 192/70.12, 89 B, 113 A

[56] References Cited

U.S. PATENT DOCUMENTS

| 1,601,235 | 9/1926 | Bullard, Jr. et al. | 192/70.12 |
| 2,770,341 | 11/1956 | Wobrock | 192/70.12 |
| 3,630,333 | 12/1971 | Schiefer et al. | 192/89 B X |
| 4,657,128 | 4/1987 | Fujito et al. | 192/113 A |

Primary Examiner—Rodney H. Bonck
Assistant Examiner—Richard M. Lorence
Attorney, Agent, or Firm—Armstrong, Nikaido, Marmelstein, Kubovcik & Murray

[57] ABSTRACT

A clutch cover assembly, in which a diaphragm spring for urging a pressure plate is disposed between said pressure plate and a clutch cover covering its backside surface, stud pins for supporting a diaphragm spring by passing through a notch of the diaphragm spring are fixed to said clutch cover, and cool air induction port opening to an external space outside the clutch is formed at a cover part between stud pins of said clutch cover.

3 Claims, 2 Drawing Sheets

CLUTCH COVER ASSEMBLY

This application is a continuation of application Ser. No. 011,811 filed Feb. 6, 1987 now abandoned.

BACKGROUND OF THE INVENTION

1. Industrial Useful Field

This invention relates to a clutch cover assembly composing a clutch for use in an automobile, vehicles, truck and the like, and particularly to a clutch cover assembly for a diaphragm spring type clutch wherein a diaphragm spring for urging a pressure plate into engagement with a clutch plate is disposed between the pressure plate and a clutch cover the clutch assembly.

2. Prior Art

In a general friction clutch, a friction facing at an outer periphery of a clutch disc is pressed against a flywheel by means of a pressure plate. Temperature rise unavoidably occurs at the friction facing etc.

Especially, in a diaphragm spring type clutch for urging the pressure plate toward the flywheel side by means of a diaphragm spring, the friction facing space is blocked by the diaphragm spring at the back of the pressure plate so that a sharp rise in temperature has occurs inside the clutch cover.

Therefore, cool air from outside the clutch cover has conventionally been induced into the clutch through finger slits formed on the diaphragm spring.

However, these finger slits have been positioned on the plane of rotation of the diaphragm spring so that little cool air has been induced from the outside to the inside of the clutch cover. Thus troubles such as abnormal wear and seizure of the friction clutch facing have occurred.

OBJECT OF THE INVENTION

An object of the invention is to overcome the foregoing troubles of clutch cooling.

STRUCTURE OF THE INVENTION

In the instant invention, a clutch cover assembly is provided, in which a diaphragm spring for urging a pressure plate toward the friction plate and flywheel is disposed between the pressure plate and a clutch cover covering the diaphragm spring. Stud pins for supporting the diaphragm spring are passed through notches in the diaphragm spring and are fixed to the clutch cover. Cool air induction ports, opening to an external space outside the clutch, are formed in the cover between stud pins fixed to the clutch cover.

DETAILED DESCRIPTION OF THE INVENTION

Embodiment

Figure 1:
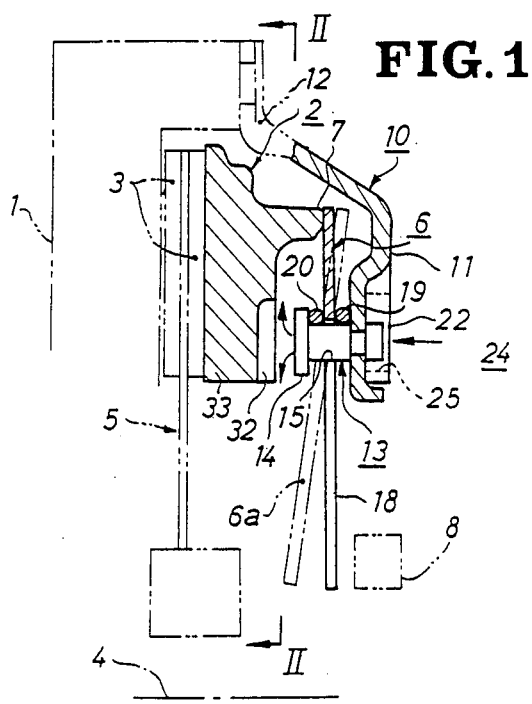
FIG. 1 is a partially vertical sectional view showing an embodiment of the invention.

In FIG. 1 illustrating an embodiment of the present invention, a friction facing 3 is disposed between an engine flywheel 1 and an annular pressure plate 2. The friction facing 3 is fastened to an outer peripheral part of a clutch disc 5 coupled to an output shaft 4 (only its center line being shown). The clutch disc 5 and an opposing annular diaphragm spring 6 are disposed with the pressure plate 2 interposed therebetween. Diaphragm spring 6 urges pressure plate 2 toward the friction facing 3 side. The outer peripheral part of diaphragm spring 6 contacts projection 7 on the clutch cover side of the pressure plate 2. A release bearing 8 is disposed at the side of diaphragm spring 6 opposite to the clutch disc 5. The release bearing 8 is installed in the vicinity of an inner peripheral part of the diaphragm spring 6 and interconnected to a not-shown clutch operating mechanism (not shown).

The diaphragm spring 6 is covered by a clutch cover 10 from its outer peripheral side and the side opposite the pressure plate. The clutch cover 10 is one piece and has an approximately annular end wall 11 and a cylindrical peripheral wall 12 extending from an outer periphery of the end wall 11 to the flywheel 1 side. A tip end of the peripheral wall 12 is fastened to the flywheel 1. One end of stud pins 13 are clamped to end wall 11, and are spaced circumferentially around cover 10 at equal distances and parallel to the output shaft 4 respectively. Each stud pin 13 projects from the end wall 11 through a notch or slotted hole 15 of the diaphragm spring 6 to the pressure plate 2 side, with the large-diameter part 14 at the other end of stud pins 13 is positioned between the pressure plate 2 and the diaphragm spring 6.

A pair of wire rings 19 and 20 are disposed radially outside of the stud pins 13. The wire rings 19 and 20 form a fulcrum diaphragm spring 6, with the inner peripheries of the rings 19 and 20 supported by the stud pins 13. The wire ring 19 is positioned between the diaphragm spring 6 and the end wall 11, and the wire ring 20 is positioned between the diaphragm spring 6 and large-diameter part 14.

Figure 3:
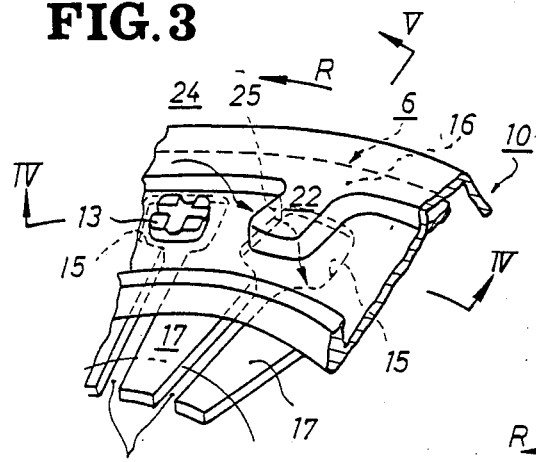
FIG. 3 is a partially prospective view.

As illustrated in FIG. 3, an annular part 16 extending in a circumferential direction of the diaphragm spring 6 is formed at an outer peripheral part of the diaphragm spring 6. An outer peripheral part of the annular part 16 is seated on the pressure plate 2 (FIG. 1). The diaphragm spring 6 has finger slits 18 which extend radially from its inner periphery to a radial intermediate portion. Inner peripheral and intermediate portions of the diaphragm spring 6 form plural radial fingers 17 divided by the finger slits 18. The notches 15 through which the stud pins 13 pass are formed adjacent to the annular part 16 by expanding the finger slits 18 in circumferential directions.

Figure 2:
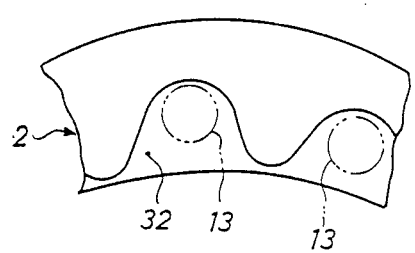
FIG. 2 is a partially front view taken at line II—II of FIG. 1.

As shown in FIG. 1, a recessed part 32 is formed at a backside of the pressure plate 2 opposite to the large-diameter part 14 of the stud pins 13. The thickness of the pressure plate 2 at 33 where the recessed part 32 is formed is made smaller than the circumferential adjacent thickness of the pressure plate 2. The recessed part 32 is formed to avoid interference with stud pins 13 when the clutch is disengaged, so that the large-diameter part 14 can enter the recessed part 32 when the clutch is disengaged and the pressure plate 2 moves toward the stud pins 13. As illustrated in FIG. 2 the edge of the recessed part 32 is formed into an approximately waved shape to clear stud pins 13.

Figure 4:
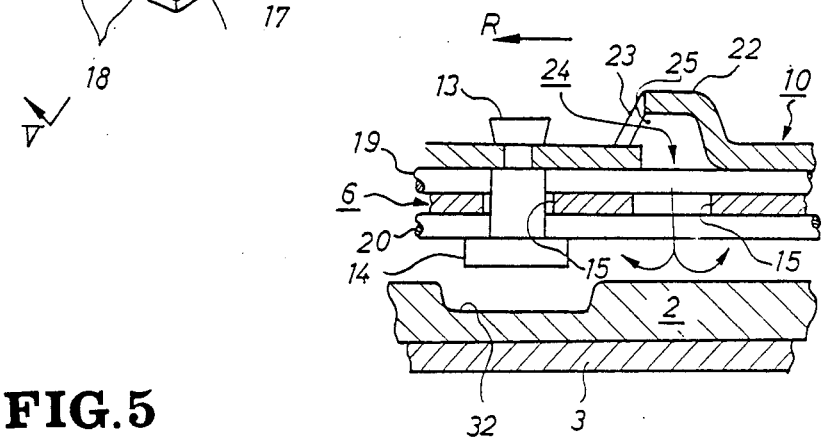
FIG. 4 is a sectional view taken at line IV—IV of FIG. 3.
Figure 5:
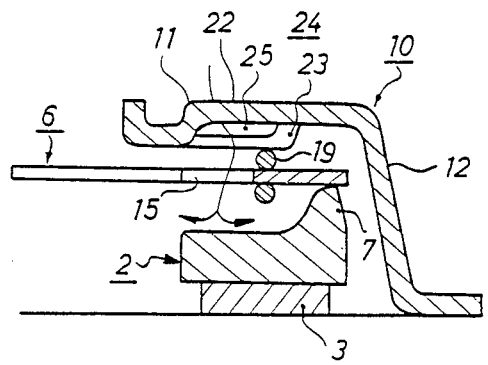
FIG. 5 is a sectional view taken at line V—V of FIG. 3.

A rib 22, which extends from the outer peripheral side to a shaft center side and projects at the backside (opposite to the flywheel 1), is formed between stud pins 13 of the clutch cover 10. A cool air induction or opening port 25 is formed on a slope 23 (FIG. 4) at a front side of the rib 22 in a rotating direction R (FIG. 3). This cool air induction port 25 opens to an external space 24 outside the clutch cover 10 in the direction of clutch rotation between stud pins 13 to enable an ingress of the cool air (like an arrow of the illustration) from the external space 24 into clutch cover 10, and is formed by notching a part of the slope 23.

Half of the notches 15, permit the stud pins 13 to pass through the diaphragm spring 6 and the remaining half of the notches form passages between the clutch cover 10 and pressure plate 2. Further, since the rib 22 is formed between the stud pins 13, the notches 15 through which no stud pins 13 pass are positioned opposite to the rib 22 where the cool air induction port 25 is formed so that the cool air flowing from the external space 24 through the cool air induction port 25 in the clutch cover 10, passes directly to the pressure plate 2.

Function of the Invention

Function will be described hereunder. At the time when the clutch is disengaged, the inner peripheral part of the diaphragm spring 6 is pressed by the release bearing 8 toward the clutch disc 5 side and deforms as shown by broken line 6a of FIG. 1 and frees the pressing force on the pressure plate 2. At the time when the clutch is engaged, the pressing force of the release bearing 8 is freed and the diaphragm spring 6 returns to a position as shown by a solid line in FIG. 1 to apply pressure to pressure plate 2. Pressure plate 2 urges friction facing 3 into engagement with flywheel 1 to engage the clutch. Torque is transmitted from the flywheel 1 through the clutch disc 5 to the output shaft 4.

In both of the above clutch engaging and disengaging states, the clutch cover 10 rotates together with the flywheel 1 so that cool air is always induced through air induction port 25 opening to the rotating direction R side. The notches 15 having spaces through which no stud pins 13 pass are positioned at the flywheel 1 side of the rib 22 and the cool air flowing from the cool air induction port 25 in the clutch cover 10 passes through the notches 15 (diaphragm spring 6) and strikes directly against the pressure plate 2 which generates heat.

Increasing the flow quantity of the cool air is easily possible by increasing the height of the rib 22.

Effect of the Invention

In the clutch cover assembly according to the present invention, the cool air induction port 25 opening to the external space 24 is formed on the slope 23 at the front side of the rib 22 in the rotating direction R, so that the cool air at the external space 24, is always induced positively through cool air induction port 25 in the clutch cover 10 to permit the pressure plate 2 and the friction facing 3 to be efficiently cooled. Accordingly, troubles such as abnormal wear and seizure of the friction facing 3 can be avoided.

Moreover, the cool air induction port 25 can be formed with a simple working of the conventional clutch cover while obtaining the above effect of avoiding troubles.

Furthermore, the cool air induction port 25 occupies only a part of the rib 22, so that a strength of the clutch cover 10 is not affected even if the cool air induction port 25 is formed on the rib 22.

What is claimed is:

1. A clutch assembly having a cover, a pressure plate and a diaphragm spring for urging said pressure plate toward and away from said cover disposed between said pressure plate and said cover, said cover covering said diaphragm spring and said pressure plate, said diaphragm spring having a plurality of notches passing through said diaphragm spring and equally spaced circumferentially around said diaphragm spring, stud pins for supporting said diaphragm spring spaced circumferentially around said cover and fixed at one of their ends to said clutch cover, said stud pins extending axially of said clutch away from said cover and passing through selected ones of said notches in said diaphragm spring, and cool air induction opening ports in said cover opening in the direction of rotation of said clutch and in circumferential alignment with other of said notches passing through said diaphragm spring and disposed circumferentially between said stud pins for drawing cooling air from the outside of said clutch cover into said cover and through said other notches for cooling said diaphragm spring and pressure plate covered by said cover, said stud pins and said air induction ports being disposed at substantially the same radial distance from a rotational axis of said clutch assembly.

2. A clutch assembly as set forth in claim 1 in which a large number of radial fingers and finger slits are formed on said diaphragm spring at its inner peripheral end portion and extending into its radial intermediate portion, said notches are formed by expanding the end portions of each finger slit at said radial intermediate portion of said diaphragm spring, and said stud pins pass through selected ones of said notches and cooling air passes through other of said notches.

3. A clutch assembly as set forth in any one of claim 1 or claim 2, in which each of said cooling air ports includes a rib projecting to the side of said cover opposite to said diaphragm spring and between said stud pin on said clutch cover, and said cool air induction port is formed on a slope at a front side of said rib in the direction of rotation of said cover.

* * * * *